United States Patent [19]

Terada et al.

[11] 4,149,202
[45] Apr. 10, 1979

[54] POWER-TRANSMITTING SYSTEM FOR USE IN CASSETTE TAPE RECORDER

[75] Inventors: Ryuji Terada, Mito; Yosiaki Tachibana, Katsuta, both of Japan

[73] Assignee: Hitachi, Ltd., Japan

[21] Appl. No.: 905,460

[22] Filed: May 12, 1978

[30] Foreign Application Priority Data

May 13, 1977 [JP] Japan .................. 52-54305

[51] Int. Cl.$^2$ .............................. G11B 15/02
[52] U.S. Cl. .................... 360/96.3; 360/90; 242/199; 74/207
[58] Field of Search ........... 360/96, 90, 93, 92, 360/131–132, 74; 242/199–201; 74/207

[56] References Cited

U.S. PATENT DOCUMENTS

| 3,211,014 | 10/1965 | Frimley | 74/207 |
| 4,040,104 | 8/1977 | Staar | 360/96 |
| 4,050,088 | 9/1977 | Okuda | 360/90 |

*Primary Examiner*—John H. Wolff
*Attorney, Agent, or Firm*—Craig & Antonelli

[57] ABSTRACT

First and second rotation-transmitting portions are integrally provided for a rotor which constitutes part of a motor. A rotary member is provided in opposed relation to the first rotation-transmitting portion. This rotary member remains in non-coupling condition to the first rotation-transmitting portion in the stopped or rest condition of the recorder, but is coupled to the first rotation-transmitting portion upon sound reproduction (sound recording) and then, upon the completion of sound reproduction, brought to the non-coupling condition to the first rotation-transmitting portion. In addition, in the course of the rotation of the aforenoted rotary member coupled to the first rotation-transmitting portion, a driving member or plate mounting a pinch roller and the like thereon is moved to a sound-reproducing (sound recording) position. Furthermore, an endless belt is trained around the second rotation-transmitting portion and a swinging mechanism serving as a rotating medium for use in fast feeding and rewinding of a tape, therebetween. A turn table on a take-up side or a pay-out side is driven, depending on the rotational direction of the second rotation-transmitting portion, thereby allowing a fast feeding or rewinding operation. As a result, the sound-reproduction (sound recording), fast feeding, and rewinding of a tape may be achieved by means of a single motor, a drive mechanism provided for the aforenoted driving member, and a swinging mechanism cooperative with a rotor which forms part of the motor.

3 Claims, 7 Drawing Figures

POWER-TRANSMITTING SYSTEM FOR USE IN CASSETTE TAPE RECORDER

LIST OF PRIOR ART REFERENCES (37 CFR 1.56 (a))

The following reference is cited to show the state of the art:

U.S. Pat. No. 3,211,014, Douglas Sanderson, Oct. 12, 1965 (74-207)

This invention relates to a power-transmitting system for use in a cassette tape recorder.

In general, a mechanism for accomplishing various kinds of operations, such as sound-reproduction, fast feeding, rewinding of a tape, and the like in a cassette tape recorder suffers from vital shortcomings in that the mechanism dictates the use of many component parts, and requires a large operating power. To cope with this, an attempt has been proposed to reduce an operating power by adopting an electromagnetic solenoid for operating the aforenoted mechanism. However, this attempt still poses a problem that an extremely close care should be paid for slowing down the quick attracting motion of the electromagnetic solenoid, when transmitting same to the aforenoted mechanism.

In this respect, another attempt has been proposed to the aspect of motors for driving a tape. More particularly, an emphasis is placed on simplifying the mechanism by adopting two motors, whereby one of the motors is used to drive a tape at a constant speed, and the other motor is used for a fast feeding, or rewinding operation for a tape. However, this attempt is not recommendable from viewpoints of an increase in manufacturing cost and lack of reasonability.

It follows from this that there has arisen a demand to enable the constant-speed feeding and fast feeding of a tape by resorting to a single motor. In this case, however, it is mandatory that many mechanisms such as a head-driving mechanism in a drive system, in which a magnetic head and a pinch roller contact the tape, a take-up mechanism for driving a take-up turn table, a brake mechanism for releasing the turn table from a braked condition, a fast feeding mechanism for rotating the turn table at a high speed for the fast feeding or rewinding operation of a tape, and the like be operably associated with one another and yet provided in a simple construction.

According to the present invention, there is provided a single motor type cassette tape recorder, in which there are provided: a pinch roller adapted to be detached from a capstan in a stopped or rest condition of the recorder, and moved towards the capstan upon reproduction (sound recording) so as to sandwich a tape between the capstan and the pinch roller for driving the tape at a constant speed; a take-up drive system adapted to be detached from a take-up turn table in a stopped or rest condition of the recorder and to be brought into contact with a turn table upon sound-reproduction (sound recording) so as to drive the turn table; and a brake mechanism adapted to contact turn tables on a take-up side and on a feeding or pay-out side, thereby applying a braking action to the aforenoted turn tables for stopping same. The cassette tape recorder according the present invention features that a driving member adapted to retain a pinch roller in a rotatable condition is moved to a sound-reproducing position by being driven by a rotary member which rotates jointly with the capstan, in association with the sound-reproducing (sound recording) operation, and then the driving member is so maintained thereafter, whereupon the take-up drive system and brake mechanism may be smoothly moved to a sound-reproducing (sound recording) positions by means of the aforenoted driving member.

The drawings presented herein refer to the tape recorder according to the present invention, in which.

Figure 1:
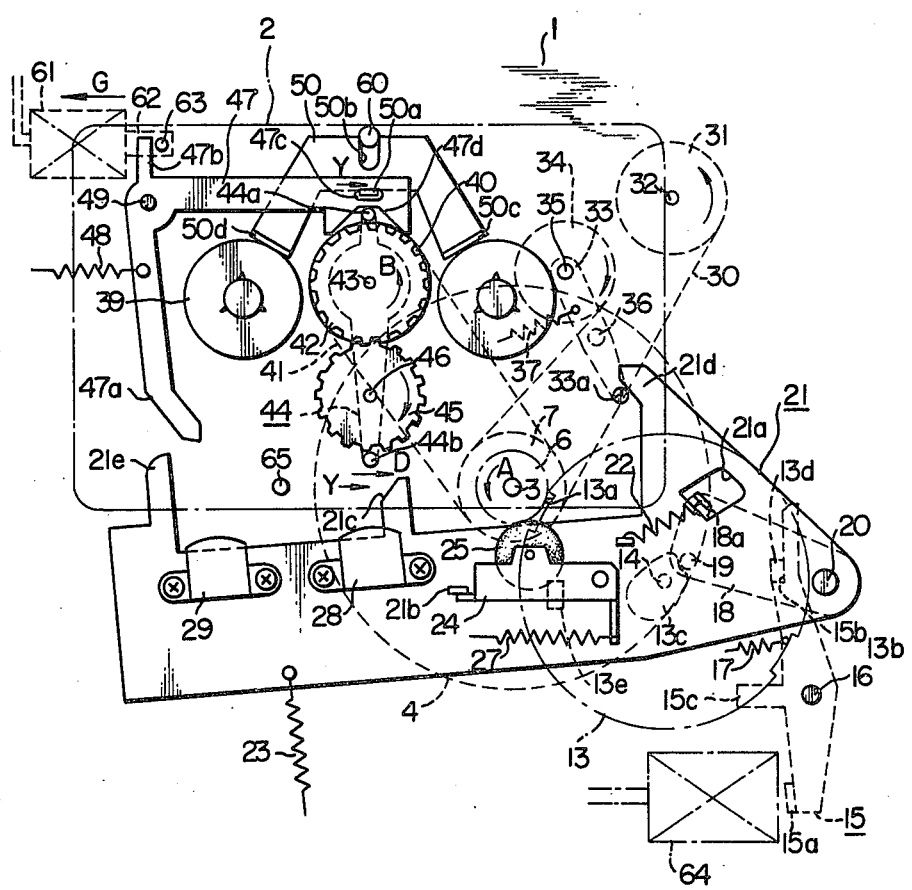
FIG. 1 is a plan view of a drive mechanism in its stopped or rest condition.

As shown in FIGS. 1 to 6, a cassette 2 is mounted on a chassis 1 in a given position by means of a locating pin and the like (not shown). A capstan 3 is attached in a manner to rotate jointly with a rotor 4, while a magnet 5 is secured in position inside the rotor 4 by means such as an adhesive or the like. In addition, the rotor 4 is formed with a gear, and a pulley portion 7 having belt grooves, into which endless belts 30, 41 are fitted. The lower end of the capstan 3 is journaled in a thrust bearing 8 secured to a yoke plate 9, which is made of a magnetic material and secured to the chassis 1 through the medium of a post (not shown). Secured to a printed board 10 provided in opposed relation to the magnet 5 are a double-layer driving coil 11 which is wound into a star shape. The magnet 5, for instance, is magnetized so as to provide eight poles, so that a magnetic flux is formed in a manner to cross the driving coil 11 between the yoke plate 9 and the magnet 5. The supply of an electric current to the driving coil 11 causes the rotor 4 to rotate at a constant rotational speed by means of a control circuit (not shown) which is provided separately. Meanwhile, there is known a motor system, in which a magnetic flux is formed in parallel with the axial direction of the rotor 4, as in the aforenoted case.

An upper portion of the capstan 3 is supported in a bearing 12 secured to the chassis 1, while the gear 6 integral with the capstan 3 meshes with a gear 13. The gear 13 is rotatably supported on a shaft 14 secured to the chassis 1 perpendicularly thereto. As shown in FIG. 1, a pair of tooth-free or cut-away portions 13a, 13b are provided on the periphery of the gear 13, while a cam portion 13c is provided in coaxial relation to the gear 13. In addition, the gear 13 is formed with two projecting portions 13d, 13e on the side surfaces of the gear 13. In a rest or stopped condition of the recorder, the tooth-free portion 13a faces the gear 6, while the projecting portion 13d is locked by a locking portion 15b of a locking arm 15. A portion 15a to be attracted by an electromagnet 64 is secured to the locking arm 15, which is provided with a lifting portion 15c which is to be hit upwards counterclockwise by means of the projecting portions 13d, 13c formed on the gear 13 in the course of rotation of the gear 13. More particularly, even if the supply of an electric current is interrupted for the electromagnet 64, after the locking arm 15 has been attracted to the electromagnet 64, the lifting portion 15c serves to prevent the locking arm 15 from being continuously attracted to the electromagnet 64, despite the residual magnetism therein, so that the locking arm 15 may be forcibly returned to the initial position, after the interruption of the supply of an electric current to the magnet 64.

The locking arm 15 is rotatably supported at a fulcrum 16, while a head-plate-operating lever 18 is rotatably supported at a fulcrum 20. The head-plate-operating lever 18 is formed with a bend or a bent portion 18a adapted to lock a spring 22 hooked to the lever 18 and to a head plate 21 therebetween, and further having a pin 19 thereon in a manner to be opposed to the cam portion 13c of the gear 13. The headplate-operating lever 18 having a pin 19 thereon may be rotated about a fulcrum 20 due to its contact with the cam portion 13c. In addition, the gear 13 is locked by the locking arm 15, pin 19 and cam portion 13, and hence the head plate 21 are so loaded as to rotate clockwise about the fulcrum 20 under the action of the spring 22. The head plate 21 is provided with a hole 21a and a projecting portion 21b serving as a stopper for a pinch-roller arm 24.

The head plate 21 is provided, on the side of the cassette 2 (upper side in FIG. 1), with a projecting portion 21d adapted to limit the movement of a take-up arm 33, in addition to a projecting portion 21c adapted to limit the movement of a swingable arm 44 during the play of a record, and a projecting portion 21e adapted to control the movement of a contacting portion 47a of a brake-operating arm 47 and positioned in opposed relation to the contacting portion 47a. Attached to the head plate 21 is a spring 23 which loads the head plate 21 so as to be kept away from the cassette 2, while a pinch roller arm 24 having a pinch roller 25 thereon is rotatably supported on a pinch-roller-arm shaft 26. A spring 27 is attached to the pinch roller arm 24 so as to urge the pinch roller 25 against the capstan 3. In addition, attached to the head plate 21 are a sound-reproducing head 28 and an errasing head 29. The head plate 21 is driven from a rest or stopped position shown in FIG. 1 to a second sound-reproducing (sound recording) position by means of gear 6 integral with the rotor 4, gear 13, cam portion 13c, pin 19, head-plate-operating lever 18, spring 22, locking arm 15, and electromagnet 64, although the operations of the head plate and the like will be described hereinafter.

A belt 30 trained around the pulley portion 7 coaxial with the capstan 3 drives a pulley 31 secured on a pulley shaft 32, as well as a take-up pulley 34 coaxial with a take-up roller 35. The take-up roller 35 is attached to one end portion of the take-up arm 33, while the other end of the take-up arm 33 is formed with a projecting portion 33a opposed to the projecting portion 21d of the head plate 21. In addition, the take-up arm 33 is rotatably supported at a fulcrum 36 in a manner that its projecting portion 33a is so loaded as to abut the projecting portion 21d of the head plate 21 under the action of a spring 37, all the times. The rotation of a take-up pulley 34 is transmitted through a known type friction mechanism to the take-up roller 35. As a result, the press-contacting action of the take-up roller 35 relative to a turn table is controlled according to the movement of the projecting portion 21d.

Figure 7:
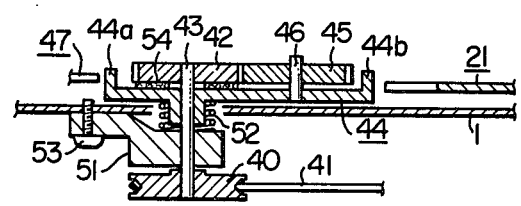
FIG. 7 is a cross-sectional view taken along the line VI—VI of FIG. 4.

A drive power is transmitted to a turn table 38 on a take-up side of a tape as well as to a turn table 39 on a supply or feeding side thereof, upon fast and rewinding of a tape, through the medium of a swinging mechanism including a belt 41, pulley 40, shaft 43, and gears 42, 45, as shown in FIGS. 1 and 7. Referring to FIG. 7, a shaft 43 having the pulley 40 secured thereto is rotatably supported in a pulley bearing 51 secured to the chassis 1 by means of a screw 53, while a gear 42 is rigidly supported on the shaft 43. In addition, a swingable arm 44 is rotatably supported on the shaft 43, and press-contacts the gear 42 through the medium of a felt friction-material 54 under the action of a spring 52. Projections 44a, 44b are formed on the swingable arm 44 so as to control the movement of the arm 44, while a gear 45 is secured on a gear shaft 46 secured to the swingable arm 44 perpendicularly thereto in a manner to mesh with the gear 42. The gear 45 is so designed as to mesh with the turn table 38 or 39, when the swingable arm 44 is swung.

A contacting portion 47a of a brake-operating arm 47 is adapted to contact the projecting portion 21e of the head plate 21, upon sound-reproduction (sound recording), thereby rotating the brake-operating arom 47 counterclockwise, so that the brake shoe portions 50c, 50d of a brake plate 50 having a projection 50 fitted in a hole 47c provided in the other end portion of the arm may be moved away from the turn tables 38, 39.

Meanwhile, the brake plate 50 is retracted, with the groove 50b therein being guided by the guide pin 60 provided on the chassis 1, due to the rotation of the brake-operating arm 47. In a addition, a contacting portion 47b is provided on the brake-operating arm 47 and cooperates with a pin 63 provided on a plunger 62 adapted to be attracted to a solenoid 61, thereby rotating the brake-operating arm 47 counterclockwise, upon fast feeding and rewinding of a tape.

Furthermore, the brake-operating arm 47 is supported on a shaft 49 in a manner to be so loaded as to rotate clockwise about the shaft 49 under the action of a spring 48. In addition, the position of the head plate 21 is controlled by means of a locating pin 65, upon sound reproduction (sound recording) of a tape.

Description will now be turned to the operation of a power-transmitting system for use in a cassette tape recorder according to the present invention. In a stopped or rest condition as shown in FIG. 1, a rotor 4 including the magnet 5, gear 6 and, belt pulley is rotated in an arrow direction A by means of a drive circuit (not shown). In this condition, the toothfree portion 13a of the gear 13 faces the gear 6, and the rotation of the gear 6 is not transmitted to the gear 13. In addition, since the projecting portion 33a of the take-up arm 33 engages the projecting portion 21d of the head plate 21, the take-up roller 35 is not brought into press-contact with the turn table 38. On the other hand, the pulley 40 is rotated in an arrow direction B by means of the endless belt 41, and the gear 42 on the shaft 43, as well, is rotated in an arrow direction B. In addition, the swingable arm 44 press-contacts the gear 42 through the medium of the felt-friction material 54 under the action of the spring 52, and the swingable arm 44 is so loaded as to rotate about the shaft 43 in an arrow direction D due to the friction created therebetween. However, in the rest condition, since the projection 44 of the swingable arm 44 engages the cam portion 47d of the brake operating arm 47, the gear 45 is kept apart from the turn table 38, and keeps idling.

Figure 2:
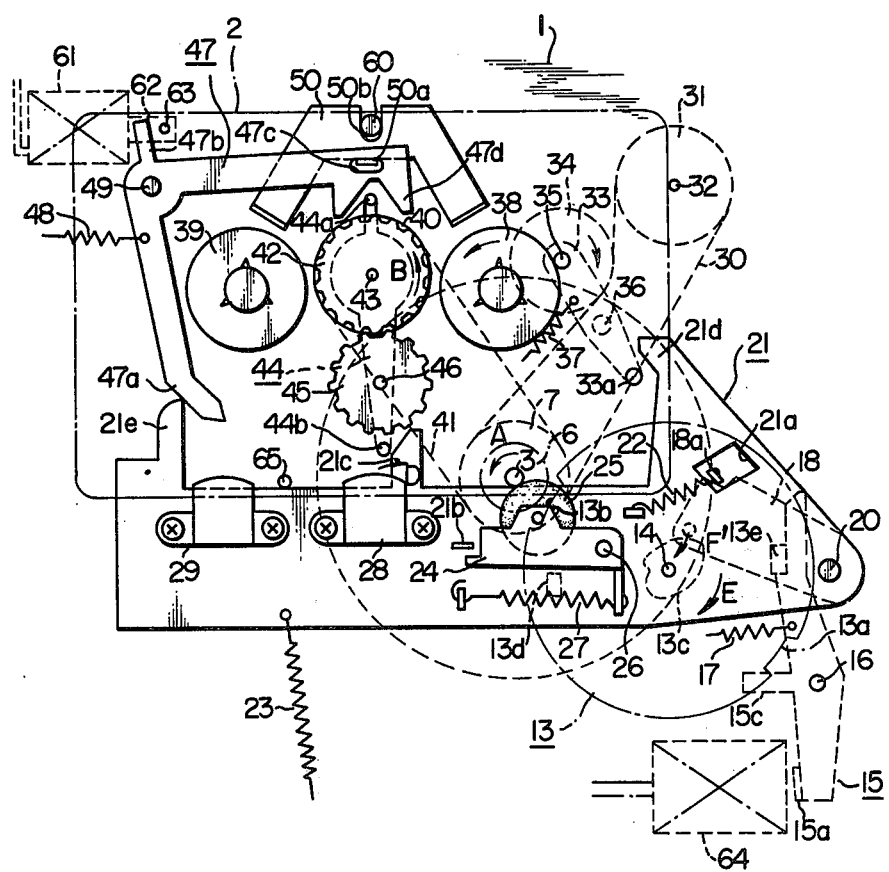
FIG. 2 is a plan view of a drive mechanism, upon sound reproduction (sound recording)
Figure 5:
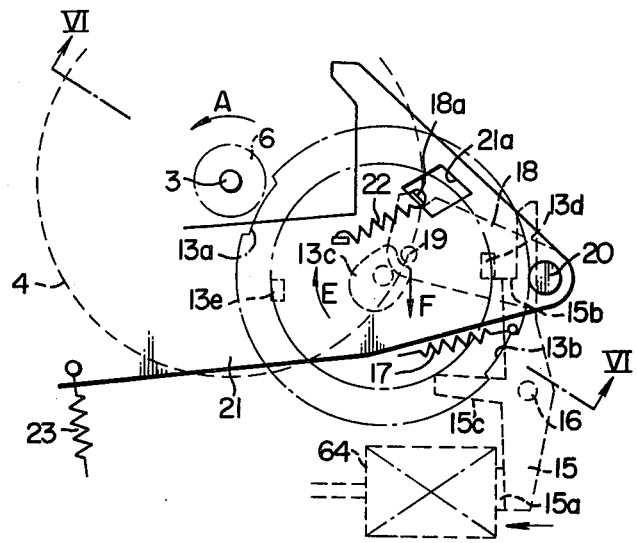
FIG. 5 is a detailed plan view of an essential part of FIG. 2.
Figure 6:
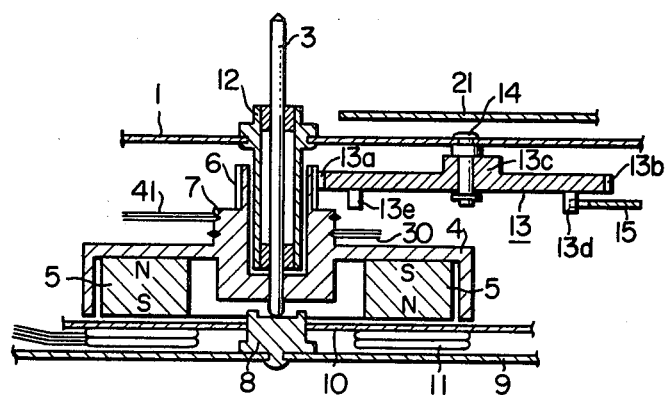
FIG. 6 is a cross-sectional view taken along the line VI—VI of FIG. 5.

Description will then be given of the sound reproduction (sound recording) of a tape with reference to FIGS. 2 and 5. When a voltage required for one pulse is impressed on the electromagnet 64 due to the operation of a sound-reproduction (sound recording)-operating key (not shown), then the electromagnet 64 attracts the portion 15a of the locking arm 15, allowing the locking arm 15 to rotate clockwise. In this respect, as is clear from FIG. 5, the cam portion 13c of the gear 13 is of such a shape as to impart a driving force F to the pin 19 on the head-plate-operating lever 18 so as to rotate the gear 13 clockwise. For this reason, when the locking portion 15b of the locking arm 15 is detached from the projecting portion 13d of the gear 13, the gear 13 is rotated to some extent clockwise and hence the tooth-free portion 13a opposed to the gear 6, as well, is rotated so as to allow the gear 6 to mesh with the teeth portion of the gear 13, with the result that the rotation of the gear 6 in an arrow direction A causes the gear 13 to rotate in a direction E.

Meanwhile, after the impression of a voltage corresponding to one pulse on the electromagnet 64, the supply of an electric current thereto is interrupted. However, it sometimes happens that the locking arm can not be returned to its non-attracted position shown in FIG. 1, due to the residual magnetism in the magnet 64, thus forming a cause for rotating the gear 13 continuously. In such a case, the head plate 21 fails to remain in the sound-reproduction (sound recording) position, and is returned to its stopped position again, leading to erroneous operation.

Accordingly, there arises a need for the locking arm 15 to bring the projecting portion 13e to its initial locking position, as soon as possible, once the locking arm 15 has released the projecting portion 13d of the gear 13 from its locked condition. To cope with this, in the course of the clockwise rotation of the projecting portion 13d after being released, the lifting portion 15c of the locking arm 15 is hit upwards counterclockwise so as to forcibly rotate the locking arm 15, thereby allowing same to lock the projecting portion 13e which is to come around subsequently. In this position, the head operating plate 18 is rotated clockwise by means of the cam portion 13c of the gear 13 and the head-plate-operating-lever pin 19, so as to allow the head plate 21 to be drawn to the head-plate-position-locating pin 65 under the action of the spring 22 to stay in a given position.

Under the aforenoted condition, the pinch roller 25 provided on the pinch-roller arm 24 drives a tape (not shown) which is maintained in press-contact with the capstan 3. In addition, the brake-operating arm 47 is rotated counterclockwise about the fulcrum 49 by means of the projecting portion 21e of the head plate 21, thereby bringing the brake plate 50 apart from the turn tables 38, 39 in the cooperation of the arm 47 with the brake plate 50. Then, the take-up arm 33 is released from the engagement with the projecting portion 21d of the head plate 21, so the take-up roller 35 is brought into press-contact with the turn table 38 to take up a tape thereon.

While the swingable arm 44 tends to rotate in an arrow direction D, the rotation of the arm 44 is hindered by the projecting portion 21c of the head plate 21, so that the gear 45 does not come close to the turn table 38. In this manner, the sound reproduction (sound recording) may be readily achieved by a simple operation, i.e., the operation of an operating key to impress a voltage on the electromagnet 64.

Figure 3:
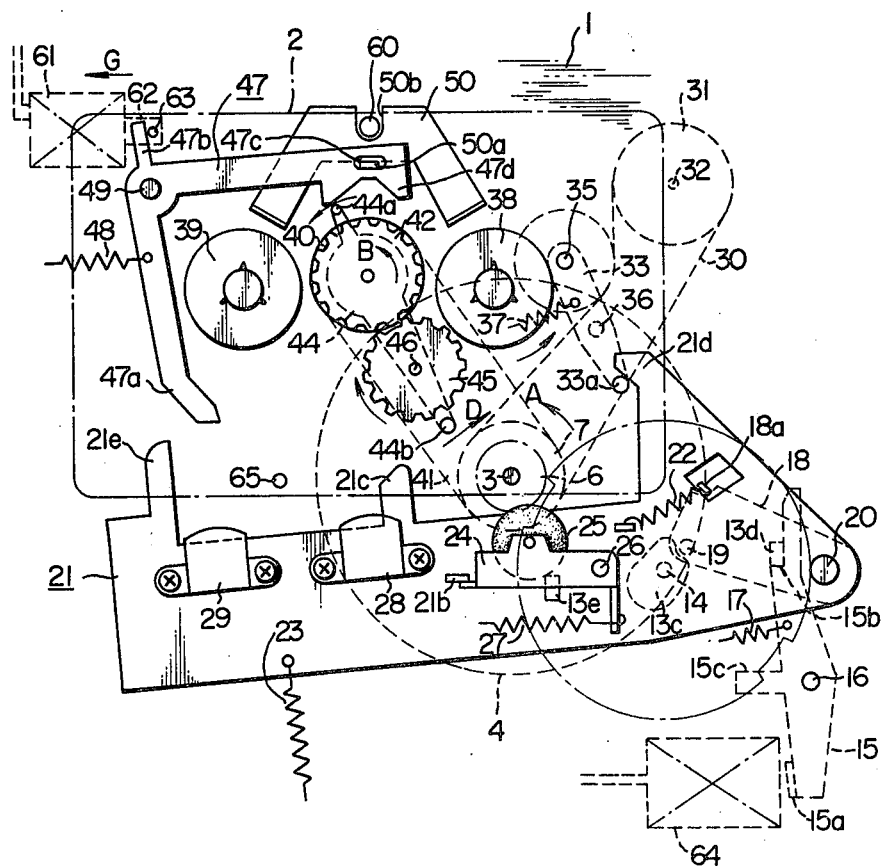
FIG. 3 is a plan view of a driving mechanism, upon fast feeding of a tape.

Description will be turned to the fast feeding operation (FF) of a tape with reference to FIG. 3. The fast feeding of a tape may be achieved by depressing a fast-feeding-operating key (not shown) in the stopped or rest condition, in which the rotor 4 including the capstan 3 is being rotated in an arrow direction A, so as to impress a voltage on the solenoid 61. More specifically, when a voltage is impressed on the solenoid 61 shown in FIG. 1, then the plunger 62 is attracted in an arrow direction G, so that the pin 63 on the plunger 62, as shown in FIG. 3, pushes on the contacting portion 47b of the brake-operating arm 47 so as to rotate the brake operating arm 47 counterclockwise. As a result, the projection 44a of the swingable arm 44 may be released from an arrested condition given by the cam portion 47d, so that the swingable arm 44 in its entirety may be swung counterclockwise about the supporting shaft 43, as shown by a swinging mechanism of FIG. 7. Then, the gear 45 meshes with a gear (not shown) on the turn table 38 so as to rotate the turn table 38 counterclockwise, thereby enabling fast rewinding of a tape. Meanwhile, the counterclockwise rotation of the brake-operating arm 47 causes the brake plate 50 engaging the hole 47c to be detached from the turn tables 38, 39, thereby releasing the brake. In the fast feeding condition, the head plate 21 is not operated, so that the movement of the take-up arm 33 is restricted by the projecting portion 21d of the head plate 21, and hence the arm 33 does not abut the turn table 32. In this manner, the fast feeding of a tape may be achieved so as to take up the tape.

Figure 4:
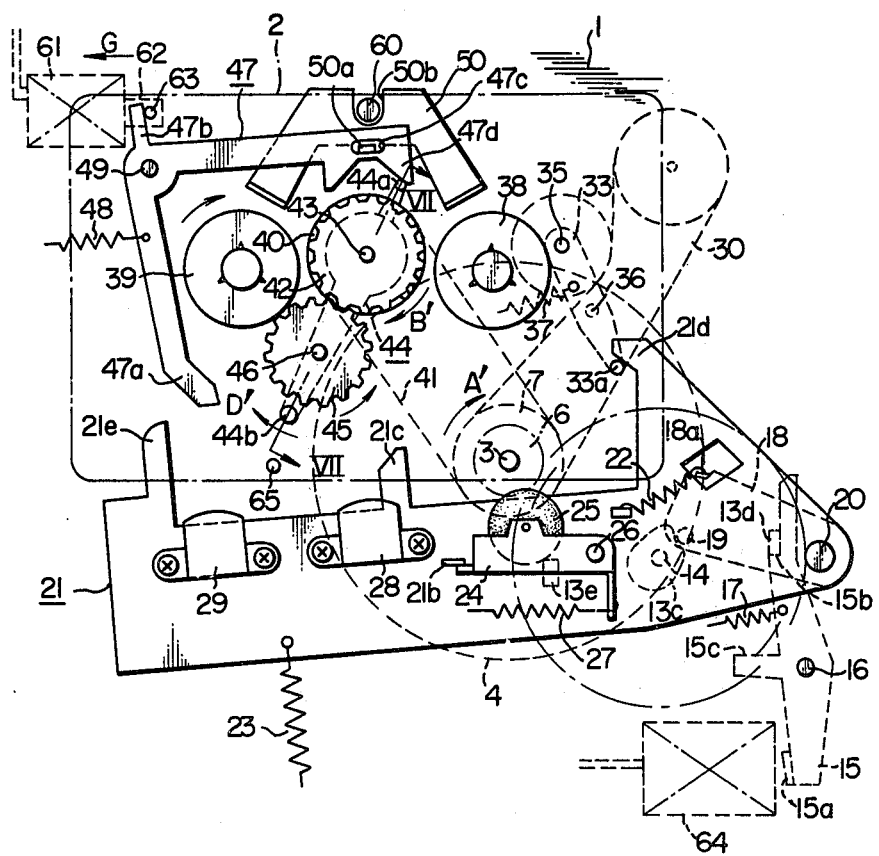
FIG. 4 is a detailed plan view of the drive mechanism, upon rewinding of the tape.

Description will not be directed to the rewinding operation (REW) of a tape with reference to FIG. 4. When a rewinding-operating key (not shown) is depressed, then the rotational direction of the rotor 4 including the capstan 3 is reversed so as to rotate clockwise in an arrow direction A'. At the same time, a voltage is impressed on the solenoid 61, and so maintained the solenoid thereafter. Like the fast-feeding of a tape, the brake-operating arm 47 is rotated counterclockwise, the swingable arm 44 is released from the arrested condition caused by the brake operating arm 47, and the movement of the brake plate is retracted, so that brake is brought into its released condition. It should be noted however that, since the rotor 4 is rotated in an arrow direction A', the pully 40 coupled thereto through the medium of the belt 41, as well as the shaft 43 and gear 42 are rotated in an arrow direction B', thus establishing a frictional coupling to the gear 42. The swingable arm 44 is swund in an arrow direction D', and the gear 45 is brought into mesh with the turn table 39, thereby rotating the turn table clockwise. Meanwhile, in this condition, the head plate 21 is not operated, so that the take-up arm 33 is held in position by the projecting portion 21d of the head plate 21, being kept apart from the turn table 38. In this manner, the rewinding condition may be achieved, so the tape may be rewound fast.

As is apparent from the foregoing, according to the present invention, the rotor is so designed as to be rotated jointly with a reversible motor, and in addition, the rotor is integrally formed with a gear provided for fast feeding and rewinding operations of a tape and a belt pulley portion adapted to drive an endless belt for driving a wingable arm in a manner that the rotations of the aforenoted gear may be transmitted to turn tables, and to drive another endless belt for driving a take-up while a gear adapted to drive a headplate driving device is provided, with the result that a power may be smoothly transmitted by the power transmitting system according to the invention, with a minimized number of component parts, and the accompanying ease of maintenance and checking.

The power transmitting system for use in a cassette tape recorder according to the present invention as has been described thus far, is simple in construction, less in number of component parts, and easy in maintenance and checking.

What is claimed is:

1. In a power transmitting system for use in a cassette tape recorder of the type, in which there are provided: a pinch roller detached from a capstan in a stopped or rest condition of said recorder, and moved towards said capstan so as to sandwich a tape between said capstan and said roller, so as to drive said tape at a constant speed; a take-up drive system detached from a take-up-side turn table in the stopped condition of said recorder, and contacting said turn table upon sound reproduction (sound recording) so as to drive said turn table; and a brake mechanism contacting turn tables on the take-up and feeding sides so as to apply a braking action to said both turn tables for stopping same, and detached from said both turn tables upon sound reproduction (sound recording), fast feeding and rewinding of a tape so as to release said turn tables from their braked condition; the improvements comprising:

a rotation-transmitting portion provided coaxially with said capstan and rotatable jointly with said capstan;

a rotary member receiving a rotational force from said rotation-transmitting portion having a coupling portion to be coupled to said rotation-transmitting portion, and a non-coupling portion provided by cutting away part of said coupling portion, said coupling portion and said non-coupling portion being provided on the periphery of said rotary member in a continuous relation, said non-coupling portion being opposed to said rotation-transmitting portion in a stopped condition of said recorder;

a locking member for locking said rotary member in its stopped position;

an electromagnetic solenoid for use in sound reproduction (sound recording), said solenoid releasing said rotary member from its locked or stopped condition caused by said locking member, upon sound reproduction (sound recording);

a cam member positioned coaxially with said rotary member and effecting a cam action in association with the rotation of said rotary member;

an auxiliary member so loaded as to contact said cam surface of said cam member all the times, under the action of a first resilient member, and rotating said cam member to a small extent under the action of said first resilient member, when a said rotary member is released from its locked condition caused by said locking member, thereby bringing said rotary member into engagement with said rotation-transmitting portion; and a driving member for retaining said pinch roller in a rotatable manner, and moving said pinch roller to the sound reproducing (sound recording) position, said driving member being provided with first and second control portions for controlling the movements of said take-up drive system and said brake mechanism, said driving member being pulled by said first resilient member in response to a further displacement of said auxiliary member, said displacement of said auxiliary member being caused by means of said cam member due to the rotation of said rotary member, when said auxiliary member brings said rotary member into a coupling relation to said rotation-transmitting portion, even in case one end of said first resilient member is locked and said drive member is so loaded so as to move towards its stopped position.

2. The improvements as set forth in claim 1, wherein said rotor is provided with a second rotation-transmitting portion; and said power transmitting system further comprises: a fast feeding mechanism including a high speed rotary member which contacts and is detached from said both turn tables, whereby when said high speed rotary member is swung so as to contact one of said turn tables, in the direction depending on the direction of rotation of said rotor which is driven by a rotating force from said second rotation-transmitting portion, said turn table is driven; and a second electromagnetic solenoid operable in association with a fast-feeding operation of a tape, and allowing a swinging action of said fast feeding mechanism.

3. The improvements as set forth in claim 1, wherein, upon sound reproduction (sound recording), said electromagnetic solenoid is supplied with an electric current for a quite short time, and the locking member is returned to its non-attracted position by the rotational force of said rotary member, after said locking member has been attracted to said electromagnetic solenoid, i.e., said locking member may be released from its continued, attracted condition caused by residual magnetism in said electromagnetic solenoid.

* * * * *